United States Patent

Sato et al.

[11] Patent Number: 5,876,617
[45] Date of Patent: Mar. 2, 1999

[54] COPOLYMER AND WATER- AND OIL-REPELLENT AGENT CONTAINING THE SAME

[75] Inventors: Masato Sato, Iwaki; Hanghua Pan, Kitaibaraki; Koichi Takahashi, Ichikawa; Tetsuya Mizuno, Kitaibaraki, all of Japan

[73] Assignee: Nippon Mektron, Limited, Tokyo, Japan

[21] Appl. No.: 870,706

[22] Filed: Jun. 6, 1997

[30] Foreign Application Priority Data

Feb. 28, 1997 [JP] Japan ..................... 9-60132

[51] Int. Cl.$^6$ ............. C09K 3/18; D06M 15/19
[52] U.S. Cl. ............. 252/8.62; 106/2; 252/8.61; 428/260; 428/289; 526/242; 526/245
[58] Field of Search ............. 106/2; 252/8.61, 252/8.62; 428/260, 289; 526/242, 245

[56] References Cited

U.S. PATENT DOCUMENTS

| | | | |
|---|---|---|---|
| 4,791,166 | 12/1988 | Saukaitis | 524/544 |
| 4,810,411 | 3/1989 | Del Pesco et al. | 252/8.62 |
| 5,324,763 | 6/1994 | Rossler et al. | 524/368 |
| 5,614,123 | 3/1997 | Kubo et al. | 252/8.62 |
| 5,688,309 | 11/1997 | Shimada et al. | 106/2 |

FOREIGN PATENT DOCUMENTS

| | | |
|---|---|---|
| 49-45758 | 12/1974 | Japan . |
| 50-3438 | 2/1975 | Japan . |
| 50-4800 | 2/1975 | Japan . |
| 50-49179 | 5/1975 | Japan . |
| 51-133511 | 11/1976 | Japan . |
| 55-45756 | 3/1980 | Japan . |
| 58-59277 | 4/1983 | Japan . |
| 59-033380 | 2/1984 | Japan ............ 106/2 |

OTHER PUBLICATIONS

Chemical Abstract No. 124:10844 which is an abstract of Japanese Patent Specification No. 07–216346 (Aug./1995).
Chemical Abstract No. 124:32221 which is an abstract of Japanese Patent Specification No. 07–228864 (Aug./1995).
Chemical Abstract No. 124:88188 which is an abstract of Japanese Patent Specification No. 07–238117 (Sep./1995).
Chemical Abstract No. 126:279048 which is an abstract of Japanese Patent Specification No. 09–151327 (Jun./1996).
Chemical Abstract No. 127:52267 which is an abstract of Japanese Patent Specification No. 09–125051 (May/1997).

*Primary Examiner*—Anthony Green
*Attorney, Agent, or Firm*—Barnes & Thornburg

[57] ABSTRACT

A copolymer, which comprises about 30 to about 70% by weight of perfluoroalkylethyl (meth)acrylate represented by the following general formula:

$$CH_2=CRCOOCH_2CH_2Rf$$

where R is a hydrogen atom or a methyl group, and Rf is a perfluoroalkyl group having 4 to 16 carbon atoms; about 25 to about 60% by weight of stearyl (meth)acrylate; about 1 to about 15% by weight of 2-chloroethyl vinyl ether; and (d) about 0.1 to about 5% by weight of N-methylol (meth) acrylamide, sum total being 100% by weight, is novel and can form a water- and oil-repellent agent having a good resistance to yellowing of textiles, etc. and capable of shorter curing and low temperature curing.

6 Claims, No Drawings

COPOLYMER AND WATER- AND OIL-REPELLENT AGENT CONTAINING THE SAME

BACKGROUND OF THE INVENTION

1. Field of the Invention

The present invention relates to a novel copolymer and a water- and oil-repellent agent containing the same, and more particularly to a novel copolymer having a distinguished water- and oil-repellence and a water- and oil-repellent agent containing the same.

2. Related Art

Generally, copolymers having a water- and oil-repellence are copolymers each comprising a (meth)acrylate monomer containing a perfluoroalkyl group capable of directly giving a water- and oil-repellence, a fluorine-free monomer capable of improving an adhesiveness to the surfaces of materials to be treated such as fibers, etc. through an affinity thereto, and a monomer capable of giving a durability through self-crosslinking or reaction with reactive groups on the surface of the materials to be treated, typical of which are copolymers having chlorine atoms combined with the main chain, such as copolymers of perfluoroalkyl group-containing (meth)acrylate and vinyl chloride (JP-B-49-45758; JP-B-50-3438; JP-B-50-4800; JP-A-58-59277, etc.) and vinylidene chloride-based copolymers (JP-A-50-49179; JP-A-51-133511, etc.).

However, water- and oil-repellent agents comprising these copolymers have such drawbacks that unsaturated bonds are formed on the main chains by dehydrochlorination to give rise to a yellowing phenomenon more or less, which is an adverse effect on the treatment of the materials, on treated materials such as fibers, etc.

As to the yellowing mechanism observed in vinyl chloride-based or vinylidene chloride-based copolymers whose main chains are substituted with chlorine atoms, it is known that unsaturated bonds, if concentratedly formed in the polymers by dehydrochlorination reaction, can serve as conjugation sites and form chromophores due to such polyene structures [Plastic Zairyo Koza (Plstic Material Lectures), Vol. 18, Vinyl chloride resin, pages 112–118, published by Nikkan Kogyo K. K., Japan]. Actually, the mechanism seems to takes more complicated decomposition steps.

The dehydrochlorination reaction is accelerated by high temperature treatment during the curing process in the presence of a cationic surfactant of emulsion dispersion type used in the preparation a water- and oil-repellent agent and cationic components in the antistatic agent or the softening agent using at the same time. Furthermore, in case of application on materials treated with some fluorescent dyes, a yellowing phenomenon, i.e. so called chlorine hindrance, occurs.

Copolymers having chlorine atoms as combined to the side chains are known, for example, copolymers having 2-chloroethyl vinyl ether as copolymerized (JP-B-49-45758). Such copolymers, when used as a water- and oil-repellent agent, can give a better feeling without causing any serious yellowing phenomenon, but still fail to satisfy desired properties such as applicability to natural fibers, shorter curing, etc. Likewise, 2-hydroxy-3-chloropropyl (meth)acrylate-based copolymers, etc. having chlorine atoms on the side chains have been so far used as a water- and oil-repellent agent (JP-A-55-45756), but have such disadvantages that feeling of stiffness will be more remarkable with increasing amount of the coplymers.

SUMMARY OF THE INVENTION

An object of the present invention is to provide a novel copolymer capable of forming a water- and oil-repellent agent having a resistance to yellowing modification on treated materials and enabling shorter curing or lower temperature curing.

The novel copolymer according to the present invention comprises (a) about 30 to about 70% by weight of perfluoroalkylethyl (meth)acrylate represented by the following general formula:

$$CH_2=CRCOOCH_2CH_2Rf$$

where R is a hydrogen atom or a methyl group, and Rf is a perfluoroalkyl group having 4 to 16 carbon atoms; (b) about 25 to about 60% by weight of stearyl (meth)acrylate; (c) about 1 to about 15% by weight of 2-chloroethyl vinyl ether; and (d) about 0.1 to about 5% by weight of N-methylol (meth)acrylamide, sum total being 100% by weight. The copolymer may be further copolymerized with not more than 5% by weight of hydroxyalkyl (meth)acrylate on the basis of total copolymer as component (e).

The copolymer has a molecular weight of about 3,000 to about 300,000, preferably about 20,000 to about 230,000 [as determined by GPC-LALLS method (light scattering method), using polystyrene having a molecular weight of 96,000 as a standard substance].

DETAILED DESCRIPTION OF THE INVENTION

Perfluoroalkylethyl (meth)acrylate as component (a) of the present copolymer is copolymerized in such a proportion as to take about 30 to about 70% by weight, preferably about 35 to about 65% by weight, of the copolymer. Below about 30% by weight, no satisfactory water- and oil-repellence will be obtained.

Stearyl (meth)acrylate as component (b) of the present copolymer is copolymerized in such a proportion as to take about 25 to about 60% by weight, preferably about 30 to about 60% by weight, of the copolymer. Below about 25% by weight, no satisfactory water-repellence will be obtained.

2-chloroethyl vinyl ether as component (c) of the present copolymer is copolymerized in such a proportion as to take about 1 to about 15% by weight, preferably about 5 to about 15% by weight, of the polymer. Below about 1% by weight, no improvement of water- and oil-repellence will be attained.

N-methylol (meth)acrylamide as component (d) of the present copolymer is copolymerized in such a proportion as to take about 0.1 to about 5% by weight, preferably about 1 to about 3% by weight, of the copolymer. Below about 0.1% by weight, no improvement of water- and oil-repellence and durability will be attained.

Hydroxyalkyl (meth)acrylate for use in the present invention as component (e) of the present copolymer includes, for example, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth) acrylate, etc., and can be copolymerized in such a proportion as to take not more than 5% by weight, preferably about 1 to about 3% by weight, of the copolymer on the basis of total copolymer. When the component (e) is copolymerized, further improvement of durability can be attained with simultaneous use of a cross-linking agent such as methyloled melamine, blocked isocyanate, etc.

To facilitate emulsion dispersibility of the copolymer, the copolymer comprising these monomer components can be further copolymerized with not more than 1% by weight, on the basis of total copolymer, of a hydrophilic monomer such as a quaternary salt of N,N-dimethylaminoethyl (meth) acrylate, polyethylene glycol (meth)acrylate, polypropylene glycol (meth)acrylate, polyethylene glycol polypropylene glycol (meth)acrylate, etc.

The present copolymer can be prepared according to various well-known methods, preferably by solution polymerization or by emulsion polymerization. Solution polymerization can be carried out by dissolving the respective monomers together into a solvent such as 1,1,1-trichloroethane, etc., followed by polymerization reaction using a radical initiator such as azobisisobutyronitrile, etc. Emulsion polymerization can be carried out by emulsifying and dispersing the respective monomers together into water, using various surfactants, preferably a non-ionic surfactant, a cationic surfactant or a mixture thereof, followed by polymerization reaction in the presence of a radical initiator such as azobisisobutylamizine-hydrochloride, etc. with stirring.

In case of solution polymerization, the resulting solution having a solid concentration of about 10 to about 40% by weight in 1,1,1-trichloroethane, etc. used as the reaction solvent is further diluted to about 0.05 to about 5% by weight with 1,1,1-trichloroethane, etc. and used as a water- and oil-repellent agent. In case of emulsion polymerization, the resulting aqueous dispersion having a solid concentration of about 10 to about 40% by weight is further diluted to about 0.05 to about 5% by weight with water and used as a water- and oil-repellent agent.

The solution or aqueous dispersion of the present copolymer thus diluted to such a solid concentration is applied to materials to be treated by spraying, dipping, foaming application, etc. Materials to be treated include, for example, textiles, leather, glass, ceramics, metals, plastics, etc. Particularly, textiles of natural fibers of cotton, hemp, silk, etc., synthetic fibers of polyamide, polyester, etc., semi-synthetic fibers of rayon, acetate, etc., or their mixed fibers can be effectively treated.

A water- and oil-repellent agent containing the present copolymer can be effectively applied to various textiles including those of natural fibers without any deterioration of feeling or without causing any yellowing. Low temperature curing and shorter curing can be enabled at the same time.

PREFERRED EMBODIMENTS OF THE INVENTION

The present invention will be described in detail below, referring to Examples.

EXAMPLES 1 TO 6

A mixture consisting of 246 g of monomers (in total of respective monomers in combinations given below), 1 g of n-dodecylmercaptan, 1 g of stearyltrimethyammonium chloride, 1 g of octylphenol-ethylene oxide adduct (20-moles ethylene oxide adduct), 30 g of acetone and 510 g of distilled water was charged into a three-necked reactor having a capacity of 1 liter, provided with a stirrer and a cooler, after the mixture was well emulsified and dispersed in a pressure homogenizer in advance, and then the emulsion dispersion and the reactor inside were thoroughly flushed with a nitrogen gas. Then, 30 g of an aqueous 20% azobis isobutylamizine hydrochloride solution was added thereto with stirring to conduct polymerization reaction at 70° C. for 4 hours. The end point of reaction was confirmed by disappearance of the respective monomers by gas chromatography.

Then, the reaction mixture was salted out with sodium sulfate, followed by washing of the precipitated copolymers with water and drying at 30° C. under reduced pressure, whereby copolymers were obtained in yield of 95% or more. Composition of copolymers was determined by fluorine elemental analysis (oxygen flask conbustion method). Molecular weight (40,000–150,000) was determined by GPC-LALLS method (light scattering method), using polystyrene having a molecular weight of 96,000 as a standard substance.

| Example No. | Monomers | Charged weight (g) | Composition (% by weight) |
|---|---|---|---|
| 1 | FAAC/STAC/CEVE/NMAM/HEMA | 150/75/15/3/3 | 61.0/30.5/6.1/1.2/1.2 |
| 2 | FAAC/STAC/CEVE/NMAM/HPMA | 150/75/15/3/3 | 61.0/30.5/6.1/1.2/1.2 |
| 3 | FAAC/STMAC/CEVE/NMAM/HPMA | 150/75/15/3/3 | 61.0/30.5/6.1/1.2/1.2 |
| 4 | FAAC/STAC/CEVE/NMAM/HBMA | 150/75/15/3/3 | 61.0/30.5/6.1/1.2/1.2 |
| 5 | FAAC/STMAC/CEVE/NMAM/HBMA | 150/75/15/3/3 | 61.0/30.5/6.1/1.2/1.2 |
| 6 | FAAC/STAC/CEVE/NMAM | 150/75/15/6 | 61.0/30.5/6.1/2.4 |

Note)
FAAC:$CH_2$=$CHCOOCH_2CH_2C_nF_{2n+1}$ (mixture of monomers with various numbers of n)
n < 6 not more than 15%
n = 8 not less than 45%
n = 10 not more than 30%
n = 12 not more than 10%
n > 14 not more than 5%
STAC: Stearyl acrylate
STMAC: Stearyl methacrylate
CEVE: 2-chloroethyl vinyl ether
NMAM: N-methylol acrylamide
HEMA: 2-hydroxyethyl methacrylate
HPMA: 2-hydroxypropyl methacrylate
HBMA: 2-hydroxybutyl methacrylate

COMPARATIVE EXAMPLES 1 TO 4

A mixture consisting of respective monomers other than vinyl chloride or vinylidene chloride in amounts and combinations given below, 1 g of n-dodecylmercaptan, 2 g of octylphenol-ethylene oxide adduct (20-moles ethylene oxide adduct), 30 g of acetone and 510 g of distilled water was added to a pressure vessel of SUS 316 having a capacity of 1 liter, provided with a stirrer, after the mixture was well emulsified and dispersed in a pressure homogenizer in advance, and then the emulsion dispersion and the vessel inside were thoroughly flushed with a nitorogen gas. Then, vinyl chloride or vinylidene chloride was charged thereto portionwise with stirring, and then 30 g of an aqueous 20% azobisisobutylamizine hydrochloride solution was added thereto to conduct polymerization reaction at 70° C. for 4 hours. The end point of reaction was confirmed by disappearance of the respective monomers by gas chromatography.

Salting-out, washing with water and drying in reduced pressure of the reaction mixture were carried out in the same manner as in the foregoing Examples 1 to 6 to obtain copolymers in yield of 95% or more. Composition and molecular weight (40,000–150,000) of the copolymers were determined in the same manner as in the foregoing Examples 1 to 6.

COMPARATIVE EXAMPLES 5 TO 8

Copolymerization reaction of respective monomers in the following combinations and amounts was carried out in the same manner as in the foregoing Examples 1 to 6.

| Comp. Ex. No. | Monomers | Charged weight (g) | Composition (% by weight) |
|---|---|---|---|
| 1 | FAAC/VC | 150/96 | 61.0/39.0 |
| 2 | FAAC/VDC | 150/96 | 61.0/39.0 |
| 3 | FAAC/STAC/VC | 150/75/21 | 61.0/30.5/8.5 |
| 4 | FAAC/STAC/VDC | 150/75/21 | 61.0/30.5/8.5 |
| 5 | FAAC/STAC/HCPMA/ NMAM/HPMA | 150/75/15/3/3 | 61.0/30.5/6.1/ 1.2/1.2 |
| 6 | FAAC/STAC | 150/96 | 61.0/39.0 |
| 7 | FAAC/CEVE | 150/96 | 61.0/39.0 |
| 8 | FAAC/STAC/CEVE | 150/75/21 | 61.0/30.5/8.5 |

Note)
VC: Vinyl chloride
VDC: Vinylidene chloride
HCPMA: 2-hydroxy-3-chloropropyl methacrylate Fiber treatment with these copolymers was carried out in the following manner:

(1) Fibers to be treated:

C: cotton (Shirting No.3)

T/C: Mixed spinning of 65% polyester/35% cotton (Twill)

N: Polyamide (Taffeta)

T: Polyester (Amunzen)

As polyester for use in yellowing tests, white polyester cloth subjected to fluorescent brightening treatment under curing conditions of a 65% wet pickup (WPU) after 1 dip×1 nip at a pin tenter temperature of 180° C. for 40 seconds, using an aqueous 0.85% solution of α,β-bis(benzoxazolyl) ethylene-based fluorescent brightening agent (C. I. Fluorescent Brightening Agent 135, trademark of a product made by Sumitomo Kagaku K. K., Japan) as a fluorescent brightening agent solution.

(2) Concentration of water- and oil-repellent agent solution

| Fibers to be treated | Solid concentration (wt %) | WPU after 1dip × 1nip (%) |
|---|---|---|
| [yellowing test] | | |
| C | 0.5, 1, 2.5 | 85 |
| Fluorescent brightening agent-treated T | 0.25, 0.5, 1.25 | 65 |
| [Bending resistance test] | | |
| C | 2.5 | 85 |
| T | 1.25 | 65 |

In bending resistance test using a cross-linking agent at the same time, the following cross-linking agent was used together with a catalyst:

M-3: an aqueous 0.3% solution of trimethylolmelamine (Sumitex resin M-3, trademark of a product made by Sumitomo Kagaku K. K., Japan)

| Fibers to be treated | Solid concentration (wt. %) | WPU after 1dip × 1nip (%) |
|---|---|---|
| [Other test] | | |
| C | 0.5 | 85 |
| T/C | 0.5 | 55 |
| N | 0.25 | 40 |
| T | 0.25 | 65 |

In durability test using a cross-linking agent at the same time, said M-3 was used together.

(3) Conditions for treatment

| Fibers to be treated | Pin tenter temperature (°C.) | Heat-treating time (min.) |
|---|---|---|
| [Yellowing test] | | |
| C | 180 | 3 |
| Fluorescent brightening agent-treated T | 180 | 3 |
| [Bending resistance test] | | |
| C | 180 | 3 |
| T | 180 | 3 |
| [Low temperature curing test] | | |
| N | 120 | 1 |
| T | 120 | 1 |
| [Shorter curing test] | | |
| N | 160 | 1/2 |
| T | 180 | 1/2 |
| [Property test of natural fibers and mixed spinning fibers] | | |
| C | 180 | 3 |
| T/C | 180 | 3 |
| [Initial effect-durability test] | | |
| C | 180 | 3 |
| N | 160 | 3 |
| T | 180 | 3 |

(4) Method for evaluation

[Yellowability]

Water- and oil-repellent agent-untreated or -treated cotton or fluorescent brightening agent-treated polyester were subjected to measure a YI value (degree of yellowing) with a spectrocolorimeter Model CM-2002 (trade mark of a product made by Minolta Co., Japan). The higher the YI value, the larger the degree of yellowing. Furthermore, visual determination under fluorescent lamp radiation was carried out, where no observation of any difference between the treated materials and the untreated materials was marked as O, whereas observation of yellowing was marked as x.

[Degree of bending resistance]

By Method A (Cantilever method) or method C(Clark method) for determing degree of bending resistance according to JIS L-1096, 6.19. The higher the measured value, the more stiff.

[Water- and oil-repellence]

Water-repellence: by a spray method according to JIS L-1092. The highter the degree of water-repellence, the better the water-repellence.

| Degree of water-repellence | Wetting state |
| --- | --- |
| 0 | Wetting throughout the face and back sides |
| 50 | Wetting throughout the face side |
| 70 | Wetting over a half in area of the face side, showing permeation of small discrete wettings through the cloth |
| 80 | Wetting in a small discrete water droplet state on the face side |
| 90 | No wetting on the face side, with deposition of small water droplets thereon |
| 100 | Neither wetting nor deposition of water droplets on the face side |

Oil-repellence: Oil-repellent grade according to AATCC TM-118 (grade of test liquid when test materials can hold droplets of test liquid for 30 seconds or more). The higher the oil-repellent grade, the better the oil-repellence.

| Oil-repellent grade | test liquid |
| --- | --- |
| 0 | Permeation of Kaydol (liquid paraffin made by Witco) |
| 1 | Kaydol |
| 2 | Kaydol/n-hexadecane (65:35 by volume) mixed liquid |
| 3 | n-hexadecane |
| 4 | n-tetradecane |
| 5 | n-dodecane |
| 6 | n-decane |
| 7 | n-octane |
| 8 | n-heptane |

[Washing durability]

An aqueous 0.08 wt. % solution of detergent (Attack Compact type, trademark of a product made by Kao Co., Japan) was used in a mixing ratio of washing water to the solution of 30:1 by volume for 3 washings at a washing water temperature of 40° C., each for 5 minutes (15 minutes in total), followed by dewatering for 5 minutes, rinsing with flowing water for 15 minutes, dewatering for 5 minutes and air drying for 20 hours.

(5) Results of evaluation

[Yellowing test: degree of yellowing (YI value)]
Treated cloth: cotton (YI value of untreated cloth: 4.62)

| | Solid concentration of water- and oil-repellent agent (%) | | |
| --- | --- | --- | --- |
| | 0.5 | 1 | 2.5 |
| Example 1 | 4.63 | 4.66 | 4.71 |
| Example 2 | 4.68 | 4.66 | 4.82 |
| Example 3 | 4.61 | 4.68 | 4.71 |
| Example 4 | 4.58 | 4.79 | 4.68 |
| Example 5 | 4.63 | 4.64 | 4.63 |
| Example 6 | 4.60 | 4.64 | 4.68 |
| Comp. Ex. 1 | 5.98 | 6.68 | 7.75 |
| Comp. Ex. 2 | 6.72 | 7.31 | 7.25 |
| Comp. Ex. 3 | 5.22 | 6.07 | 6.86 |
| Comp. Ex. 4 | 5.31 | 5.95 | 7.04 |

-continued

Treated cloth: Fluorescent brightening-treated polyester
(YI value of untreated cloth −11.04)

| | Solid concentration of water- and oil-repellent agent (%) | | |
| --- | --- | --- | --- |
| | 0.25 | 0.5 | 1.25 |
| Example 1 | −10.90 | −11.02 | −10.99 |
| Example 2 | −11.02 | −10.98 | −11.00 |
| Example 3 | −11.03 | −11.04 | −10.97 |
| Example 4 | −11.05 | −10.89 | −10.99 |
| Example 5 | −10.85 | −11.03 | −10.96 |
| Example 6 | −11.01 | −11.00 | −10.96 |
| Comp. Ex. 1 | −10.49 | −10.42 | −8.81 |
| Comp. Ex. 2 | −10.07 | −9.31 | −8.59 |
| Comp. Ex. 3 | −10.82 | −10.50 | −8.72 |
| Comp. Ex. 4 | −10.74 | −10.47 | −8.65 |

[Yellowing test: visual determination]
Treated cloth: cotton

| | Solid concentration of water- and oil-repellent agent (%) | | |
| --- | --- | --- | --- |
| | 0.5 | 1 | 2.5 |
| Example 1 | ○ | ○ | ○ |
| Example 2 | ○ | ○ | ○ |
| Example 3 | ○ | ○ | ○ |
| Example 4 | ○ | ○ | ○ |
| Example 5 | ○ | ○ | ○ |
| Example 6 | ○ | ○ | ○ |
| Comp. Ex. 1 | ○~X | X | X |
| Comp. Ex. 2 | X | X | X |
| Comp. Ex. 3 | ○ | ○ | ○~X |
| Comp. Ex. 4 | ○ | ○~X | X |

Treated cloth: Fluorescent brightening agent treated polyester

| | Solid concentration of water- and oil-repellent agent (%) | | |
| --- | --- | --- | --- |
| | 0.25 | 0.5 | 1.25 |
| Example 1 | ○ | ○ | ○ |
| Example 2 | ○ | ○ | ○ |
| Example 3 | ○ | ○ | ○ |
| Example 4 | ○ | ○ | ○ |
| Example 5 | ○ | ○ | ○ |
| Example 6 | ○ | ○ | ○ |
| Comp. Ex. 1 | ○~X | X | X |
| Comp. Ex. 2 | X | X | X |
| Comp. Ex. 3 | ○ | ○ | ○~X |
| Comp. Ex. 4 | ○ | ○~X | X |

[Bending resistance test]

| Fibers | Case | Cantilever method (length/width) | Clark method (length/width) |
| --- | --- | --- | --- |
| C | Example 2 | 44/30 | 36/23 |
|  | Comp. Ex. 5 | 53/36 | 44/30 |
| T | Example 2 | 44/27 | 36/24 |
|  | Comp. Ex. 5 | 47/36 | 44/27 |

[Low temperature curing test]

| Fibers | Case | Degree of water-repellence | Oil-repellent grade |
| --- | --- | --- | --- |
| N | Example 1 | 100 | 2 |
|  | Example 2 | " | " |
|  | Example 3 | " | " |
|  | Example 4 | " | " |
|  | Example 5 | " | " |
|  | Example 6 | " | " |
|  | Comp. Ex. 7 | 80 | " |
|  | Comp. Ex. 8 | 90 | " |

-continued

| Fibers | Case | Degree of water-repellence | Oil-repellent grade |
|---|---|---|---|
| T | Example 1 | 100 | 4 |
|   | Example 2 | " | " |
|   | Example 3 | " | " |
|   | Example 4 | " | " |
|   | Example 5 | " | " |
|   | Example 6 | " | " |
|   | Comp. Ex. 7 | 80 | 2 |
|   | Comp. Ex. 8 | 90 | " |

[Shorter curing test]

| Fibers | Case | Degree of water-repellence | Oil-repellent grade |
|---|---|---|---|
| N | Example 1 | 100 | 3 |
|   | Example 2 | " | " |
|   | Example 3 | " | " |
|   | Example 4 | " | " |
|   | Example 5 | " | " |
|   | Example 6 | " | " |
|   | Comp. Ex. 7 | 80 | 2 |
|   | Comp. Ex. 8 | 90 | " |
| T | Example 1 | 100 | 5 |
|   | Example 2 | " | " |
|   | Example 3 | " | " |
|   | Example 4 | " | " |
|   | Example 5 | " | " |
|   | Example 6 | " | " |
|   | Comp. Ex. 7 | 90 | 2 |
|   | Comp. Ex. 8 | 100 | " |

[Property improvement of natural and mixed spinning fibers]

| Fibers | Case | Degree of water-repellence | Oil-repellent grade |
|---|---|---|---|
| C | Example 3 | 100 | 4 |
|   | Example 4 | " | " |
|   | Comp. Ex. 6 | 80 | 1 |
|   | Comp. Ex. 8 | 90 | 2 |
| T/C | Example 3 | 100 | 5 |
|   | Example 4 | " | " |
|   | Comp. Ex. 6 | 90 | 1 |
|   | Comp. Ex. 8 | 100 | 2 |

[Improvent of initial property]

| Fibers | Case | Degree of water-repellence | Oil-repellent grade |
|---|---|---|---|
| C | Example 2 | 100 | 4 |
|   | Example 6 | " | " |
|   | Comp. Ex. 8 | 90 | 2 |
| N | Example 2 | 100 | 3 |
|   | Example 6 | " | " |
|   | Comp. Ex. 8 | " | 2 |
| T | Example 2 | " | 6 |
|   | Example 6 | " | " |
|   | Comp. Ex. 8 | " | 2 |

[Improvement of durability]

| Fibers | Case | Degree of water-repellence | Oil-repellent grade |
|---|---|---|---|
| C | Example 2 | 90 | 1 |
|   | Example 6 | " | " |
|   | Comp. Ex. 8 | 70 | 0 |
| N | Example 2 | 80 | " |
|   | Example 6 | 90 | " |
|   | Comp. Ex. 8 | 70 | " |
| T | Example 2 | 80 | " |
|   | Example 6 | " | " |
|   | Comp. Ex. 8 | 70 | " |

[Initial property using a cross-linking agent M-3 at the same time]

| Fibers | Case | Degree of water-repellence | Oil-repellent grade |
|---|---|---|---|
| C | Example 1 | 100 | 4 |
|   | Example 2 | " | " |
|   | Example 3 | " | " |
|   | Example 4 | " | " |
|   | Example 5 | " | " |
|   | Example 6 | " | " |
|   | Comp. Ex. 8 | 90 | 2 |
| N | Example 1 | 100 | 3 |
|   | Example 2 | " | " |
|   | Example 3 | " | " |
|   | Example 4 | " | " |
|   | Example 5 | " | " |
|   | Example 6 | " | " |
|   | Comp. Ex. 8 | 90 | 2 |
| T | Example 1 | 100 | 6 |
|   | Example 2 | " | " |
|   | Example 3 | " | " |
|   | Example 4 | " | " |
|   | Example 5 | " | " |
|   | Example 6 | " | 5 |
|   | Comp. Ex. 8 | " | " |

[Durability using a cross-linking agent M-3 at the same time]

| Fibers | Case | Degree of water-repellence | Oil-repellent grade |
|---|---|---|---|
| C | Example 1 | 90 | 1 |
|   | Example 2 | " | " |
|   | Example 3 | " | " |
|   | Example 4 | " | " |
|   | Example 5 | " | " |
|   | Example 6 | " | " |
|   | Comp. Ex. 8 | 70 | 0 |
| N | Example 1 | 90 | 1 |
|   | Example 2 | " | " |
|   | Example 3 | " | " |
|   | Example 4 | " | " |
|   | Example 5 | " | " |
|   | Example 6 | " | " |
|   | Comp. Ex. 8 | 70 | 0 |
| T | Example 1 | 90 | 1 |
|   | Example 2 | " | " |
|   | Example 3 | " | " |
|   | Example 4 | " | " |
|   | Example 5 | " | " |
|   | Example 6 | " | " |
|   | Comp. Ex. 8 | 70 | 0 |

It can be concluded from the foregoing facts that:

① When monomer (b) is incorporated into compositions of copolymers (a)–(b), water-repellence can be improved by shorter curing and low temperature curing (Examples 1 to 6–Comp. Ex. 7 and 8);

② When monomer (c) is incorporated into compositions of copolymers (a)–(b), water- and oil-repellent property mainly of natural fibers can be improved (Examples 3 and 4–Comp. Ex.6 and 8);

③ When monomer (d) is incorporated into compositions of copolymers (a)–(b)–(e), initial property and durability of water- and oil-repellent repellence can be improved (Examples 2 and 6–Comp. Ex.8);

④ When monomer (e) is incorporated into compositions of copolymers (a)–(b)–(c)–(d), durability of water- and oil-repellence can be improved by simultaneous use of a well-known cross linking agent (Examples 1 to 6–Comp. Ex.8);

⑤ Since neither vinyl chloride nor vinylidene chloride is incorporated into copolymers, any yellowing problem is not encountered (Examples 1 to 6–Comp. Ex.1 to 4);

(6) Since (meth)acrylate having a stearyl group with a long chain is copolymerized, good water-repellence can be obtained by low temperature curing and shorter curing without impairing the feeling (Examples 1 to 6–Comp. Ex.7 and 8); and (7) Since monomer (c) whose side chain is connected to the ether bond, the side chains have a sufficient degree of freedom and the feeling is never impaired (Example 2–Comp. Ex.5).

What is claimed is:

1. A copolymer which comprises:
    (a) about 30 to about 70% by weight of perfluoroalkyl-ethyl (meth)acrylate represented by the following general formula:

$$CH_2=CRCOOCH_2CH_2Rf$$

where R is a hydrogen atom or a methyl group, and Rf is a perfluoroalkyl group having 4 to 16 carbon atoms;
    (b) about 25 to about 60% by weight of stearyl (meth) acrylate;
    (c) about 1 to about 15% by weight of 2-chloroethyl vinyl ether; and
    (d) about 0.1 to about 5% by weight of N-methylol (meth)acrylamide, sum total being 100% by weight.

2. A polymer according to claim 1, further comprising not more than 5% by weight of hydroxyalkyl (meth)acrylate.

3. A water- and oil-repellent agent, which comprises a copolymer comprising:
    (a) about 30 to about 70% by weight of perfluoroalkyl-ethyl (meth)acrylate represented by the following general formula:

$$CH_2=CRCOOCH_2CH_2Rf$$

where R is a hydrogen atom or a methyl group, and Rf is a perfluoroalkyl group having 4 to 16 carbon atoms;
    (b) about 25 to about 60% by weight of stearyl (meth) acrylate;
    (c) about 1 to about 15% by weight of 2-chloroethyl vinyl ether; and
    (d) about 0.1 to about 5% by weight of N-methylol (meth)acrylamide, sum total being 100% by weight.

4. A water- and oil-repellent agent, which comprises a copolymer comprising:
    (a) about 30 to about 70% by weight of perfluoroalkyl-ethyl (meth)acrylate represented by the following general formula:

$$CH_2=CRCOOCH_2CH_2Rf$$

where R is a hydrogen atom or a methyl group, and Rf is a perfluoroalkyl group having 4 to 16 carbon atoms;
    (b) about 25 to about 60% by weight of stearyl (meth) acrylate;
    (c) about 1 to about 15% by weight of 2-chloroethyl vinyl ether;
    (d) about 0.1 to about 5% by weight of N-methylol (meth)acrylamide; and
    (e) not more than 5% by weight of hydroxyalkyl (meth) acrylate, sum total being 100% by weight.

5. A textile article having the water- and oil-repellent agent according to claim 3, applied thereto.

6. A textile article having the water- and oil-repellent agent according to claim 4, applied thereto.

* * * * *